US009776458B2

(12) United States Patent
Bonhomme

(10) Patent No.: US 9,776,458 B2
(45) Date of Patent: Oct. 3, 2017

(54) TIRE FOR A HEAVY VEHICLE, AND ARRANGEMENT OF TIRES ON THE DRIVE AXLE AND ON THE STEERING AXLE

(75) Inventor: Patrice Bonhomme, Parent (FR)

(73) Assignees: COMPAGNIE GENERALE DES ESTABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 695 days.

(21) Appl. No.: 13/977,963

(22) PCT Filed: Dec. 9, 2011

(86) PCT No.: PCT/EP2011/072353
§ 371 (c)(1),
(2), (4) Date: Sep. 25, 2013

(87) PCT Pub. No.: WO2012/093019
PCT Pub. Date: Jul. 12, 2012

(65) Prior Publication Data
US 2014/0014245 A1    Jan. 16, 2014

(30) Foreign Application Priority Data
Jan. 4, 2011   (FR) ..................... 11 50035

(51) Int. Cl.
*B60C 11/03* (2006.01)
*B60C 11/04* (2006.01)
*B60C 19/00* (2006.01)

(52) U.S. Cl.
CPC ........ *B60C 11/0309* (2013.01); *B60C 11/033* (2013.01); *B60C 11/0304* (2013.01);
(Continued)

(58) Field of Classification Search
CPC ............ B60C 11/0304; B60C 11/0306; B60C 11/04; B60C 11/1369
(Continued)

(56) References Cited

U.S. PATENT DOCUMENTS 3,162,229 A   12/1964  Ellenrieder et al.
4,546,808 A   10/1985  Fontaine et al.
(Continued)

FOREIGN PATENT DOCUMENTS

DE   1480992    *  3/1969
EP   0148721 A2     7/1985
(Continued)

OTHER PUBLICATIONS

English machine translation of DE1480992, dated Mar. 1969.*
(Continued)

*Primary Examiner* — Robert Dye
(74) *Attorney, Agent, or Firm* — Dickinson Wright PLLC

(57) ABSTRACT

Disclosed herein is an example of a tire, and arrangements of multiple tires for a heavy goods vehicle having a tread provided on one side of the equatorial median plane with a sculpture of a first kind and on the other side of the equatorial median plane with a sculpture of a second kind, the first kind of sculpture comprising at least three grooves of generally circumferential orientation. The tired disclosed herein is provided to avoid having to change tires at the change of season, notably of the arrival of winter, on a heavy goods vehicle and more particularly on the drive axles of the said vehicle for which these changes require additional work.

4 Claims, 2 Drawing Sheets

(52) U.S. Cl.
CPC ............ B60C 11/04 (2013.01); B60C 19/001 (2013.01); *B60C 2011/0346* (2013.01); *B60C 2200/06* (2013.01)

(58) Field of Classification Search
USPC ...................................................... 152/209.8
See application file for complete search history.

(56) References Cited

U.S. PATENT DOCUMENTS

| | | | | |
|---|---|---|---|---|
| 4,856,571 | A | * | 8/1989 | Collette .............. B60C 11/0306 152/209.18 |
| 4,905,748 | A | | 3/1990 | Kukimoto et al. |
| 5,421,387 | A | | 6/1995 | Emerson |
| 5,679,186 | A | * | 10/1997 | Tagashira ................ B60C 11/12 152/209.23 |
| 2003/0024621 | A1 | * | 2/2003 | Neugebauer ............ B60C 11/11 152/209.22 |

FOREIGN PATENT DOCUMENTS

| | | | |
|---|---|---|---|
| EP | 0578216 | A1 | 1/1994 |
| EP | 2202098 | A1 | 6/2010 |
| JP | 08-067112 | * | 3/1996 |
| JP | 10-071810 | * | 3/1998 |
| JP | 2007-161123 | * | 6/2007 |

OTHER PUBLICATIONS

English machine translation of JP10-071810, dated Mar. 1998.*
English machine translation of JP2007-161123, dated Jun. 2007.*
English machine translation of JP08-067112, dated Mar. 1996.*

International Search Report (PCT/ISA/210) issued on Feb. 6, 2012, by the European Patent Office as the International Searching Authority for International Application No. PCT/EP2011/072353.

* cited by examiner

TIRE FOR A HEAVY VEHICLE, AND ARRANGEMENT OF TIRES ON THE DRIVE AXLE AND ON THE STEERING AXLE

FIELD OF THE INVENTION

The present invention relates to tires for heavy goods vehicles and more particularly the treads of such tires. It also relates to an arrangement of tires fitted to a drive axle of a heavy goods vehicle.

DESCRIPTION OF RELATED ART

In the field of heavy goods vehicles it is usual to fit the front axle (steering axle) and rear axle (drive axle) of a heavy goods vehicle with tires adapted to the specific stresses of each axle (transverse stresses for the steering or load-carrying axle, stresses of driving and braking torque on the drive axle), for the purpose of optimizing the performance of this vehicle notably with respect to its drivability, its braking and its capacity to follow an imposed trajectory. The terms "fitting" or "arrangement" are used to designate the tires being fitted to one and the same axle and the way in which they are fitted on this axle.

As a general rule, it is also necessary to change tire type for each axle depending on the period of the year: for runs outside the winter period, tires are usually used that have treads provided with certain sculpture designs while, for runs taking place in the winter period, it is recommended to fit on these same axles tires of which the treads have sculpture designs different from the foregoing and also suited to the conditions for running on snowy or icy roads. "Sculpture" means the design both on the surface of the tread in the new state (called tread surface) and complementarily the design in the thickness of the tread. This sculpture consists of elements in relief delimited by grooves which are themselves delimited by facing walls that are sufficiently far apart for these walls not to come into contact against one another during running in usual conditions. Moreover, the elements in relief may comprise sipes of which the facing walls are close to one another to the point of being, at least partially, in contact with one another in the usual conditions of use.

Having to fit each axle of a heavy goods vehicle with specific tires leads to more onerous management and a larger quantity of tires stored, not forgetting the servicing times which immobilize the vehicles.

Formerly, proposals have been made to produce on one and the same tire, designed to be fitted on a given axle, a tread that is suitable both for winter running conditions and for non-winter running conditions.

For example, U.S. Pat. No. 4,905,748 combines on an outer portion and on an inner portion both different materials, natural rubber on one side and synthetic rubber on the other and different transverse stripes on the tread surface. This configuration makes it possible to achieve a satisfactory result notably in winter conditions and in non-winter conditions (these two materials both being appropriate for providing the performances that are necessary and essential for running in wet weather and in dry weather).

It is also known practice to fit tires of which the treads have different sculptures on either side of their equatorial plane. U.S. Pat. No. 3,162,229 shows such a tire. This document discloses essentially the placing of relief elements that are circumferentially continuous on the portion of the tire that is towards the outside of the vehicle when this tire is fitted on the said vehicle.

Definitions

The ratio of surface recess or percentage of surface recess of a sculpture is equal to the ratio between the surface of the recessed portions (essentially the grooves) delimited by the relief elements and the total surface area (the sum of the contact surfaces of these relief elements and of the recess surfaces). A low ratio of surface recess indicates a large surface of contact of the relief elements and a low surface of recess between these relief elements.

Equatorial median plane: this is a plane perpendicular to the rotation axis and passing through the points of the tire that are radially furthest from the said axis; this plane virtually divides the tire into two portions, a first portion, called the outer portion, and a second portion (called the inner portion). When the tire is fitted on an axle of a vehicle, the inner portion of a tire is that which faces the said vehicle.

A block is an element in relief formed on the tread which is delimited by recesses or grooves and comprising lateral walls and a contact face designed to come into contact with the road.

A rib is a relief element which is formed on a tread and which is delimited by two grooves oriented in one and the same direction; this groove comprises lateral walls and a contact face designed to come into contact with the road.

"Groove" means a space formed in a relief element, this space being delimited by facing walls, the average distance between these walls being such that they cannot be in contact with one another in the usual running conditions.

"Sipe" means a space formed in a relief element, this space being delimited by facing walls and being at a distance from one another but being able to come at least partially into contact in the usual running conditions.

"Radial direction" means a direction that is perpendicular to the rotation axis of the tire (this direction corresponds to the direction measuring the thickness of the tread).

"Axial or transverse direction" means a direction parallel to the rotation axis of the tire.

"Circumferential direction" means a direction tangential to any circle centred on the rotation axis.

"Axially outwards" means a direction that is oriented towards the outside of the inner cavity of the tire inside which the inflation pressure is applied.

Inside of a tire tread: corresponds to the side of the tread which, when the tire is fitted on an axle of a heavy goods vehicle, faces the vehicle. The outside corresponds to the side situated on the other side of the equatorial plane relative to the inside.

Simple fitting axle: an axle on which two tires are fitted, the insides of these tires facing one another once they are installed.

Twin-fitted axle: an axle on which two pairs of tires are fitted, for each pair of tires the insides not facing one another, only the insides of the innermost tires of the vehicle in each pair facing one another.

SUMMARY

The object of the present invention is to avoid having to change tires at the change of season, notably of the arrival of winter, on a heavy goods vehicle and more particularly on the drive axles of the said vehicle for which these changes require additional work.

Accordingly, the subject of the invention is a tire for a heavy goods vehicle having a tread provided on one side of the equatorial median plane with a sculpture of a first kind and on the other side of the equatorial median plane with a sculpture of a second kind, the first kind of sculpture comprising at least three grooves of generally circumferential orientation, these grooves delimiting at least two ribs of generally circumferential orientation, these ribs being provided with a plurality of sipes oriented transversely or substantially transversely, the second kind of sculpture comprising at least two grooves of generally circumferential orientation and a plurality of grooves of generally transverse orientation, these grooves delimiting a plurality of blocks, defined on each first and second kind of sculpture is a ratio of surface recess, this tread being characterized in that the ratio of surface recess of the first kind of sculpture is equal or substantially equal to the ratio of surface recess of the second kind of sculpture.

"Equal or substantially equal ratios of surface recess" means that the difference between the ratios of recess is at most equal to 5%.

This relation between the ratios of surface recess of the two kinds of sculpture must be at least satisfied in the new state and up to a degree of wear corresponding to substantially half of the thickness of the tread.

It should be noted that the first kind of sculpture preferably has no oblique or transverse grooves so as to have only circumferentially continuous ribs. "Circumferentially continuous" should be understood in this instance to be that a rib may however be provided with sipes, the latter having their walls that come into contact with one another at least partly when passing in contact with a road.

It is however possible to position, on the axially outermost portion of the tread and on this first kind of sculpture, a plurality of grooves having widths smaller than the widths of the grooves formed on the second kind of sculpture. Preferably, the ratio between these widths is at least equal to three.

In another variant of the invention, the width of the ribs of the second kind of sculpture is greater than that of the relief elements of the first kind of sculpture. In a preferred variant, the ratio between these widths is at most equal to 1.5.

In order to simplify the manufacture of the tire provided with a tread according to the invention, the material forming the tread is of one type and identical whether it be for the first kind of sculpture or the second kind of sculpture.

In order to optimize the operation of each kind of sculpture, it is desirable to use specific materials for forming the first and second kinds of sculpture.

Advantageously, the ratio of surface recess of each kind of sculpture of one and the same tire is at least equal to 25% and at most equal to 40%.

The relief elements of the second kind of sculpture are blocks comprising lateral faces in the circumferential direction and lateral faces in the transverse direction. It is particularly advantageous, in order to have even wear, that the lateral faces in the circumferential direction of each block have different inclinations relative to a radial direction (or direction perpendicular to the tread surface). Thus the lateral face of which the intersection with the contact face of the block determines an edge that is the first to come into contact when running on a road, is called the leading face. It is advantageous that this leading face has an inclination relative to a radial direction that is greater than the inclination of the other lateral face (called the trailing face).

Advantageously, the blocks of the second kind of sculpture have lateral faces corresponding to the leading and trailing faces that have different inclinations. It is therefore preferable for the angle of the leading face to be greater than the angle of the trailing face (for example 25 degrees on the leading face and 5 degrees on the trailing face) in order to reduce the phenomenon of more pronounced wear on one edge than on the other and leading to wear that is called uneven. Naturally, the angles of the leading faces of the blocks of the second kind of sculpture of all the tires of one and the same drive axle are identical as are the angles of the trailing faces of these same tires.

Preferably, each kind of sculpture on a tire according to the invention occupies an axial width that is substantially half of the tread. But it is possible, depending on the requirement, for one or other of the sculptures of the first kind or of the second kind to occupy more than half of the axial width of the tread.

Moreover, the subject of the invention is an arrangement of the tires on a steering axle of a heavy goods vehicle that makes it possible to run while keeping these same tires on the said axle in both winter conditions and non-winter conditions.

With this in view, an arrangement is proposed of two tires on a steering axle of a heavy goods vehicle, each of these two tires having a tread provided on one side of its equatorial median plane with a sculpture of a first kind and on the other side of this same plane with a sculpture of a second kind, the first kind of sculpture comprising at least three grooves of generally circumferential orientation, these grooves delimiting three ribs of generally circumferential orientation, these ribs being provided with a plurality of sipes oriented transversely or substantially transversely, the second kind of sculpture comprising at least two grooves of generally circumferential orientation and a plurality of grooves of generally transverse orientation, these grooves delimiting a plurality of blocks, defined on each type of sculpture is a ratio of surface recess (the ratio between the surface area of the grooves and the total surface area of the tread), the ratio of recess of the first type of sculpture is equal to the ratio of recess of the second type of sculpture, this tire arrangement on a drive axle being characterized in that the first kinds of sculpture of the two tires of this axle are placed on the said axle so as to be situated on the outside relative to the vehicle.

"Equal ratios of surface recesses" means that the difference between the ratios of recess is at most equal to 5%.

Moreover, the subject of the invention is an arrangement of the tires on a drive axle of a heavy goods vehicle making it possible to run while retaining these same tires on the said axle both in winter conditions and in non-winter conditions.

For this purpose, an arrangement of four wheels is proposed on a drive axle of a heavy goods vehicle, each of these four tires having a tread provided on one side of its equatorial median plane with a sculpture of a first kind and on the other side of this same plane with a sculpture of a second kind, the first kind of sculpture comprising at least three grooves of generally circumferential orientation, these grooves delimiting three ribs of generally circumferential orientation, these ribs being provided with a plurality of sipes oriented transversely or substantially transversely, the second kind of sculpture comprising at least two grooves of generally circumferential orientation and a plurality of grooves of generally transverse orientation, these grooves delimiting a plurality of blocks, defined on each type of sculpture is a ratio of surface recess (the ratio between the surface area of the grooves and the total surface area of the tread), the ratio of recess of the first type of sculpture is equal to the ratio of recess of the second type of sculpture, this arrangement of tires on a drive axle being characterized in that the first kinds of sculpture of the four tires of this axle are placed on the said axle so as to be situated on the inside relative to the vehicle.

"Equal ratios of surface recesses" means that the difference between the ratios of recess is at most equal to 5%.

However less preferably, it is possible to fit a drive axle with four tires, two of these tires being provided with a tread of which the sculpture is of a first kind in order to be optimized on icy ground and two other tires being provided with a tread of which the sculpture is of a second kind in order to be optimized on snowy ground.

For this purpose, an arrangement of four tires is proposed on a drive axle of a heavy goods vehicle, two of these tires being provided with a tread of which the sculpture is of a first kind in order to be optimized on icy ground and two other tires being provided with a tread of which the sculpture is of a second kind in order to be optimized on snowy ground the first kind of sculpture comprising at least three grooves of generally circumferential orientation, these grooves delimiting three ribs of generally circumferential orientation, these ribs being provided with a plurality of sipes oriented transversely or substantially transversely, the second kind of sculpture comprising at least two ribs of generally circumferential orientation and a plurality of grooves of generally transverse orientation, these grooves delimiting a plurality of blocks, defined on each type of sculpture is a ratio of surface recess (the ratio between the surface area of the grooves and the total surface area of the tread), the ratio of recess of the first type of sculpture is equal to the ratio of recess of the second type of sculpture, this arrangement of tires on a drive axle being characterized in that, once fitted on the axle, the tires provided with a first kind of sculpture are situated axially on the inside of the tires provided with a second kind of sculpture.

"Equal ratios of surface recess" means that the difference between the ratios of recess is at most equal to 5%.

Other features and advantages of the invention emerge from the description made hereinafter with reference to the appended drawings which show, as non-limiting examples, embodiments of the subject of the invention.

DETAILED DESCRIPTION OF SPECIFIC EMBODIMENTS

To make the figures easier to read, the same reference symbols may be used for the description of variants of the invention when these reference symbols refer to elements of one and the same nature whether it be structural or else functional.

Figure 1:
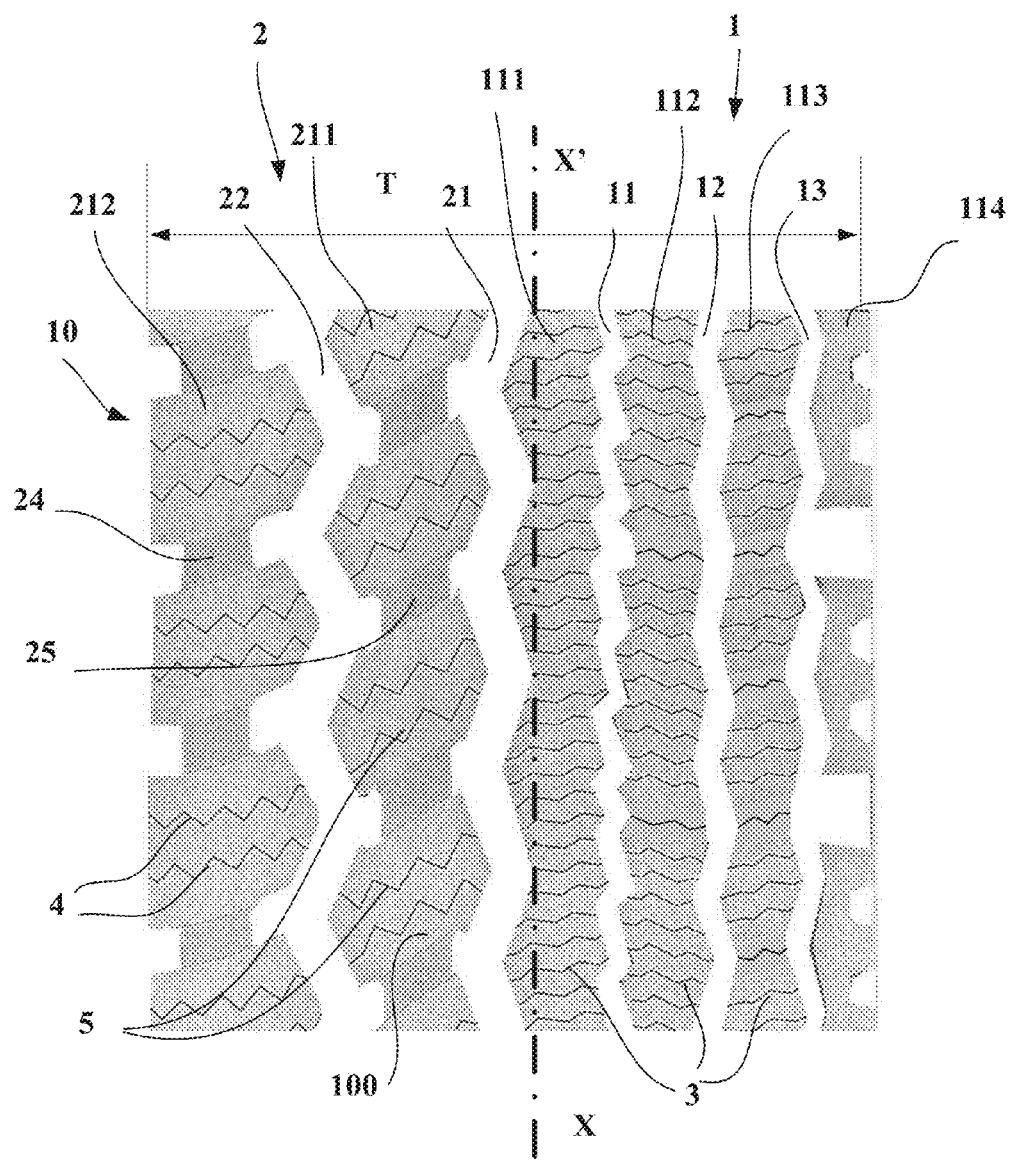
FIG. 1 represents a plan view of the design of a tread for a tire according to the invention.

FIG. 1 represents a plan view of the design of a tread 10 for a tire according to the invention having dimension 315/80 R 22.5. This tread comprises a running surface 100 designed to come into contact with a road and, cutting into this running surface, a sculpture formed of a plurality of relief elements.

This tread 10 has a width T equal to 277 mm corresponding substantially to the maximum axial distance of the points of its running surface that can come into contact with a road in nominal pressure and load conditions of use.

FIG. 1 shows the line XX' of the intersection of the equatorial median plane with the plane of the figure, this equatorial median plane, perpendicular to the rotation axis of the tire, passing through the points of the tread radially furthest from the rotation axis. This plane divides the tread into two portions.

A first portion 1, situated on the right side of FIG. 1, is provided with a sculpture of a first kind, this sculpture being of "ice" type, that is to say more suitable for runs on icy ground.

A second portion 2, situated on the left side of FIG. 1, is provided with a sculpture of a second kind of "snow" type, this sculpture being preferably effective on snowy ground.

Naturally, these two kinds of sculptures have satisfactory performances for safety notably whether the road is dry or wet outside winter periods. The material forming the tread, identical for the first and second portions 1, 2 is chosen by those skilled in the art also to satisfy this condition.

The first kind of sculpture situated on the right side of FIG. 1 comprises three zigzag grooves 11, 12, 13 of generally circumferential orientation, these grooves having a depth equal to 20 mm and an average width equal to 5 mm. These grooves delimit three ribs 111, 112, 113 with an average width equal to 35 mm and a row 114 of edge blocks. Moreover, each of the ribs and the blocks of this first kind of sculpture is provided with a plurality of sipes 3 approximately 10 mm apart, these sipes having a depth equal to that of the grooves. A rigid sculpture is thus formed in the circumferential direction by virtue of the presence of continuous ribs, the sipes being of a width appropriate to close when passing in contact with the road.

The second kind of sculpture situated on the left side of FIG. 1 comprises two grooves 21, 22 of generally circumferential orientation, these grooves having a width equal to 15 mm and a depth equal to 20 mm. These grooves 21, 22 have a zigzag line. Also formed on this portion 2 of the tread is a plurality of grooves 24, 25 of oblique orientation relative to the circumferential direction, these oblique grooves having a width equal to the width of the circumferential grooves 21, 22 of the portion 2. These oblique grooves 24, 25 delimit, with the circumferential grooves 21, 22, blocks 211, 212 provided with a small number of sipes 4, 5 (in the present case, two zigzag sipes). These blocks have an average axial width equal to 40 mm. This gives a relatively flexible sculpture in the circumferential direction compared with the sculpture of the first kind.

In order to limit reducing the circumferential rigidity of the sculpture of the second kind, platforms are formed between the blocks 4 and between the blocks 5. These platforms have a height equal to 50% of the depth of the oblique grooves 24, 25, this height being measured from the bottom of the said grooves.

Overall, what distinguishes the second kind of sculpture from the first kind lies in a greater total length of grooves (in this instance "grooves" includes both the circumferential grooves and the transverse or oblique grooves) while the number of grooves of generally circumferential orientation is smaller in this second kind compared with the first kind. Moreover, the portion 1 forming the first kind is provided with more sipes of oblique or transverse orientation. Preferably, the blocks of the second kind of sculpture are provided with at most three transverse sipes. In order to reduce the incidence of the sipes on the first and the second kinds of sculpture, it is advisable to provide the walls limiting these sipes with mechanical means of immobilization, such as for example zigzag geometries or reliefs provided to interact with recesses.

The ratios of surface cutting for the two kinds of sculpture are equal to 35% in the present case.

Figure 2:
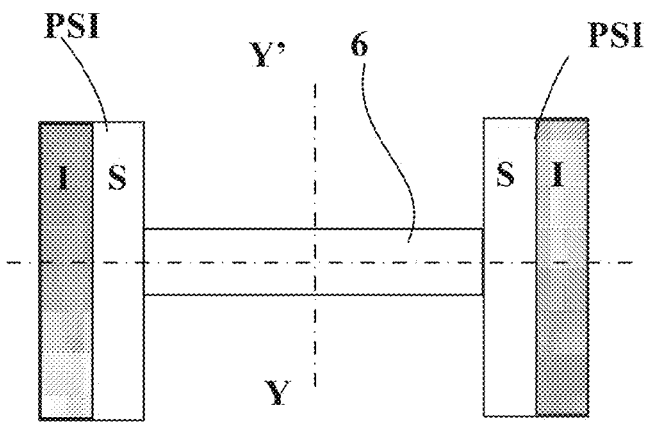
FIG. 2 shows an arrangement according to the invention for a simple fitting on a steering axle of a heavy goods vehicle.

FIG. 2 shows an arrangement according to the invention for a single fitting on a steering axle 6 of a heavy goods vehicle.

In this fitting, each tire PSI situated on either side of the median axis of the vehicle (line YY' in FIG. 3) is formed of two tires identical to the tire as described with the support of FIG. 1. The portion of the tire of the second kind of sculpture (marked S in the figure) is fitted so as to be on the inside, that is to say towards the vehicle at the time of fitting on the said vehicle. The portion of the tire of the first kind of sculpture (marked I in the figure) is therefore oriented towards the outside of the vehicle.

Figure 3:
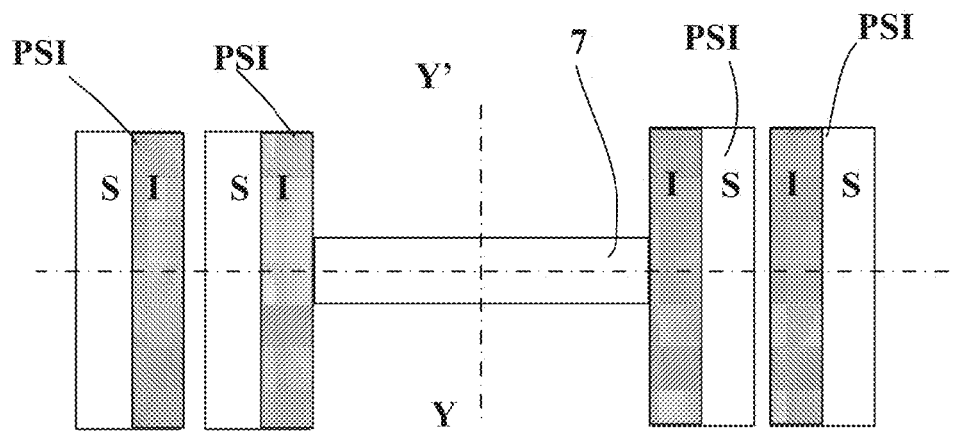
FIG. 3 shows an arrangement according to the invention for a twinned fitting on a drive axle of a heavy goods vehicle.

FIG. 3 shows an arrangement according to the invention for a twin fitting on a drive axle 7 of a heavy goods vehicle.

In this fitting, each pair of tires PSI situated on either side of the median axis of the vehicle (line YY' in FIG. 3) is formed of two tires identical to the tire as described with the support of FIG. 1. Each tire PSI comprises a tread provided with a sculpture formed of a first kind of sculpture (marked I) and of a second kind of sculpture (marked S) according to the invention.

On this drive axle 7, each tire is mounted so that the portion of the tread of a first kind of sculpture I is positioned between the portion of the same tread of a second kind of sculpture S and the median axis YY' of the vehicle.

Figure 4:
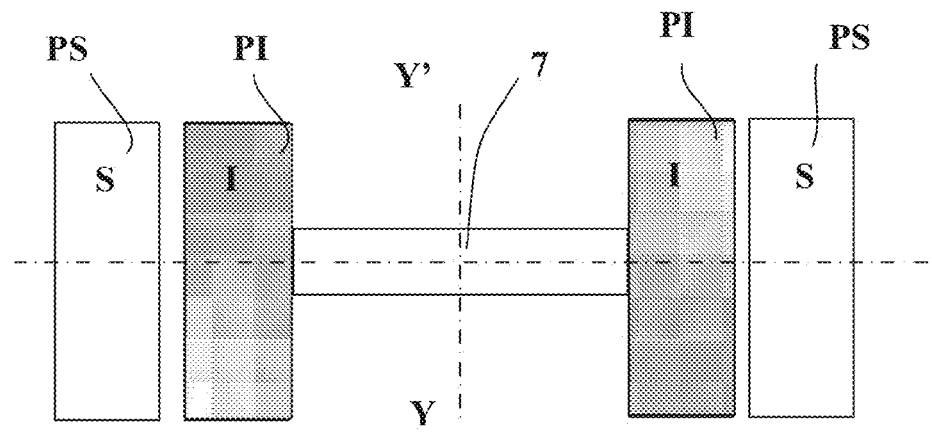
FIG. 4 shows an arrangement according to the invention for a twin fitting on a drive axle.

FIG. 4 shows an arrangement of tires according to the invention fitted as twins on a drive axle 7 of a heavy goods vehicle, each of the tires comprising a single kind of sculpture, either ice type (marked I in the figure) or snow type (marked S in the figure).

In this fitting, each pair of tires PI, PS situated on either side of the median axis of the vehicle (line YY' in FIG. 4) is formed of a tire of a first kind PI of "ice" type and of a tire of a second kind PS of "snow" type, the tire of the first kind PI being situated between the tire of the second kind PS and the median axis YY' of the vehicle. These tires whether they be of a first or second kind have one and the same ratio of surface recess (that is to say having a difference of ratio of surface recess that is at most equal to 5%).

Naturally, the invention is not limited to the examples described and shown and various modifications can be made thereto without departing from the context defined by the claims.

The invention claimed is:

1. Tire for a heavy goods vehicle having a tread provided on one side of the equatorial median plane with a sculpture of a first kind and on the other side of the equatorial median plane with a sculpture of a second kind,
   the first kind of sculpture comprising at least three grooves of generally circumferential orientation, these grooves delimiting at least two continuous ribs of generally circumferential orientation, these continuous ribs being provided with a plurality of sipes oriented transversely or substantially transversely,
   the second kind of sculpture comprising at least two grooves of generally circumferential orientation and a plurality of grooves, these grooves delimiting a plurality of blocks,
   defined on each kind of sculpture is a ratio of surface recess,
   wherein the ratio of surface recess of the first kind of sculpture is equal or substantially equal to the ratio of recess of the second kind of sculpture, and wherein, the blocks having leading and trailing faces, the angle of the leading face is different from the angle of the trailing face, said angles being measured relative to the radial direction, and
   a platform in between each of the plurality of blocks, with each platform having a height equal to 50% a depth of the plurality of the grooves, wherein the platforms are only disposed on a side of the equatorial plane on which the sculpture of the second kind is located,
   wherein the plurality of grooves further includes a plurality of oblique grooves, with a width of the plurality of oblique grooves being equal to a width of the at least two grooves of generally circumferential orientation.

2. Tire according to claim 1, wherein the blocks are provided with at most three sipes.

3. An arrangement of two tires on a steering axle of a heavy goods vehicle having a median axis YY', each of these two tires having a tread provided on one side of its equatorial median plane with a sculpture of a first kind and on the other side of this same plane with a sculpture of a second kind,
   the first kind of sculpture comprising at least three grooves of generally circumferential orientation, these grooves delimiting at least two continuous ribs of generally circumferential orientation, these continuous ribs being provided with a plurality of sipes oriented transversely or substantially transversely,
   the second kind of sculpture comprising at least two grooves of generally circumferential orientation and a plurality of grooves, these circumferential and transverse grooves delimiting a plurality of blocks,
   defined on each type of sculpture is a ratio of surface recess (ratio between the surface area of the grooves and the total surface area of the tread), the ratio of recess of the first type of sculpture is equal to the ratio of recess of the second type of sculpture,
   wherein this arrangement of tires on a steering axle has the portion of the tread of a second kind positioned between the portion of the same tread of a first kind and the median axis YY' of the vehicle, and
   a platform in between each of the plurality of blocks, with each platform having a height equal to 50% a depth of the plurality of the grooves, wherein the platforms are only disposed on a side of the equatorial plane on which the sculpture of the second kind is located,
   wherein the plurality of grooves further includes a plurality of oblique grooves, with a width of the plurality of oblique grooves being equal to a width of the at least two grooves of generally circumferential orientation.

4. An arrangement of four tires on a drive axle of a heavy goods vehicle having a median axis YY', each of these tires having a tread provided on one side of its equatorial median plane with a sculpture of a first kind and on the other side of this same plane with a sculpture of a second kind,
   the first kind of sculpture comprising at least three grooves of generally circumferential orientation, these grooves delimiting three continuous ribs of generally circumferential orientation, these continuous ribs being provided with a plurality of sipes oriented transversely or substantially transversely, the second kind of sculpture comprising at least two grooves of generally circumferential orientation and a plurality of grooves, these grooves delimiting a plurality of blocks, defined on each type of sculpture is a ratio of surface recess (the ratio between the surface area of the grooves and the total surface area of the tread), the ratio of recess of the first type of sculpture is equal to the ratio of recess of the second type of sculpture, wherein this arrangement of tires on the drive axle has the portion of the tread of a first kind positioned between the portion of the same tread of a second kind and the median axis YY' of vehicle, and a platform in between each of the plurality of blocks, with each platform having a height equal to 50% a depth of the plurality of the grooves, wherein the platforms are only disposed on a side of the equatorial plane on which the sculpture of the second kind is located, wherein the plurality of grooves further includes a plurality of oblique grooves, with a width of the plurality of oblique grooves being equal to a width of the at least two grooves of generally circumferential orientation.

* * * * *